United States Patent
Mossoba et al.

(10) Patent No.: US 10,839,369 B1
(45) Date of Patent: Nov. 17, 2020

(54) DYNAMIC ELECTRONIC COMMUNICATION WITH VARIABLE MESSAGES USING ENCRYPTED QUICK RESPONSE CODES

(71) Applicant: Capital One Services, LLC, McLean, VA (US)

(72) Inventors: Michael Mossoba, Arlington, VA (US); Joshua Edwards, Philadelphia, PA (US); Abdelkader Benkreira, Washington, DC (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/517,765

(22) Filed: Jul. 22, 2019

(51) Int. Cl.
| | |
|---|---|
| *G06Q 20/32* | (2012.01) |
| *G06K 19/06* | (2006.01) |
| *G06Q 20/40* | (2012.01) |
| *G06Q 20/04* | (2012.01) |

(52) U.S. Cl.
CPC ... *G06Q 20/3276* (2013.01); *G06K 19/06028* (2013.01); *G06K 19/06037* (2013.01); *G06Q 20/0457* (2013.01); *G06Q 20/4016* (2013.01)

(58) Field of Classification Search
CPC .......... G06Q 20/3276; G06Q 20/0457; G06Q 20/4016; G06K 19/06028; G06K 19/06037
USPC ......................................................... 705/41
See application file for complete search history.

(56) References Cited

U.S. PATENT DOCUMENTS

| | | | | |
|---|---|---|---|---|
| 2,108,314 | A * | 2/1938 | Kelly | B42D 5/001 283/66.2 |
| 5,465,206 | A * | 11/1995 | Hilt | G06Q 20/108 705/40 |
| 5,769,403 | A * | 6/1998 | Tuttleman | B42D 15/0053 270/1.02 |
| 5,825,876 | A | 10/1998 | Peterson, Jr. | |
| 6,677,858 | B1 | 1/2004 | Faris et al. | |
| 6,948,062 | B1 | 9/2005 | Clapper | |
| 9,280,770 | B2 * | 3/2016 | Robison | G06K 7/1447 |
| 10,074,081 | B1 * | 9/2018 | Radlow | G06Q 20/102 |

(Continued)

OTHER PUBLICATIONS

WhatsApp payments now supports QR codes: How it works. (Mar. 27, 2018). The Hindustan Times Retrieved from https://dialog.proquest.com/professional/docview/2018611350?accountid=131444 on Jun. 18, 2020 (Year: 2018).*

(Continued)

*Primary Examiner* — Kito R Robinson
(74) *Attorney, Agent, or Firm* — Hunton Andrews Kurth LLP

(57) ABSTRACT

A first client device can be in communication with a server. The server can store in a database records associated with a first user account and a second user account. The first user can scan a code printed on an object. The first client device can read the code and transmit it to the server. The server can activate a default message when it receives the code. The first user can pass the object to a second user. The second user can scan the physical object at a second client device. The second client device can read the code and transmit it to the server. Once the server receives the code from the second client device, the server can transmit the default message from the first user account to the second user account according to a transmission plan. The second client device can display the transmitted message.

17 Claims, 6 Drawing Sheets

(56) References Cited

U.S. PATENT DOCUMENTS

| | | | | |
|---|---|---|---|---|
| 10,147,076 B2* | 12/2018 | Zhou | | G09C 5/00 |
| 10,325,277 B1* | 6/2019 | Ballepu | | G06F 3/04817 |
| 10,475,031 B2* | 11/2019 | Cheong | | G06Q 20/36 |
| 2003/0182194 A1* | 9/2003 | Choey | | G06Q 20/20 |
| | | | | 705/16 |
| 2005/0071657 A1 | 3/2005 | Ryan | | |
| 2006/0053053 A1* | 3/2006 | Baggett | | G06Q 30/0233 |
| | | | | 705/14.33 |
| 2006/0106845 A1* | 5/2006 | Frank | | G06F 9/5005 |
| 2007/0083461 A1* | 4/2007 | Andalib | | G06Q 40/025 |
| | | | | 705/38 |
| 2008/0260397 A1* | 10/2008 | Itagaki | | G03G 21/043 |
| | | | | 399/39 |
| 2009/0265249 A1* | 10/2009 | Bishop | | G06Q 20/04 |
| | | | | 705/21 |
| 2011/0010277 A1* | 1/2011 | Enzaldo | | G06Q 20/405 |
| | | | | 705/30 |
| 2011/0137742 A1 | 6/2011 | Parikh | | |
| 2012/0041881 A1* | 2/2012 | Basu | | G06Q 20/3672 |
| | | | | 705/67 |
| 2012/0072346 A1* | 3/2012 | Barkan Daynovsky | | |
| | | | | G06Q 20/425 |
| | | | | 705/44 |
| 2012/0185317 A1* | 7/2012 | Wong | | G06Q 30/0222 |
| | | | | 705/14.23 |
| 2012/0209749 A1* | 8/2012 | Hammad | | G06Q 20/20 |
| | | | | 705/27.1 |
| 2012/0222055 A1 | 8/2012 | Schaefer et al. | | |
| 2012/0267432 A1* | 10/2012 | Kuttuva | | G06Q 20/26 |
| | | | | 235/379 |
| 2013/0018783 A1* | 1/2013 | Ansari | | G06Q 20/354 |
| | | | | 705/39 |
| 2013/0054271 A1* | 2/2013 | Langford | | G06Q 50/24 |
| | | | | 705/3 |
| 2013/0066749 A1* | 3/2013 | Cooke | | G06Q 30/0643 |
| | | | | 705/27.2 |
| 2013/0140361 A1* | 6/2013 | Ling | | G06K 19/14 |
| | | | | 235/380 |
| 2013/0159077 A1* | 6/2013 | Stringfellow | | G06Q 30/02 |
| | | | | 705/14.16 |
| 2013/0166441 A1* | 6/2013 | Kobylkin | | G06Q 20/354 |
| | | | | 705/39 |
| 2013/0179336 A1 | 7/2013 | Lyons et al. | | |
| 2013/0198078 A1* | 8/2013 | Kirsch | | G06Q 20/4014 |
| | | | | 705/44 |
| 2013/0219479 A1 | 8/2013 | DeSoto et al. | | |
| 2013/0256403 A1 | 10/2013 | MacKinnon | | |
| 2013/0346319 A1* | 12/2013 | Tan | | G06Q 20/3276 |
| | | | | 705/71 |
| 2014/0019358 A1* | 1/2014 | Priebatsch | | G06Q 20/20 |
| | | | | 705/44 |
| 2014/0095219 A1* | 4/2014 | Zises | | G06Q 10/02 |
| | | | | 705/5 |
| 2014/0129428 A1* | 5/2014 | Tyler | | G06Q 30/06 |
| | | | | 705/39 |
| 2014/0207577 A1* | 7/2014 | Takeda | | H04W 4/12 |
| | | | | 705/14.64 |
| 2014/0278609 A1* | 9/2014 | Capps | | G06Q 20/14 |
| | | | | 705/5 |
| 2014/0279554 A1* | 9/2014 | Priebatsch | | G06Q 20/385 |
| | | | | 705/67 |
| 2014/0289107 A1* | 9/2014 | Moshal | | G06Q 20/3255 |
| | | | | 705/40 |
| 2014/0337175 A1 | 11/2014 | Katzin et al. | | |
| 2015/0088674 A1 | 3/2015 | Flurscheim et al. | | |
| 2015/0178721 A1 | 6/2015 | Pandiarajan et al. | | |
| 2015/0178724 A1* | 6/2015 | Ngo | | H04L 9/0869 |
| | | | | 705/71 |
| 2015/0193765 A1* | 7/2015 | Gadotti | | G06Q 20/3274 |
| | | | | 705/39 |
| 2015/0248664 A1 | 9/2015 | Makhdumi et al. | | |
| 2015/0324766 A1* | 11/2015 | Park | | G06Q 20/3572 |
| | | | | 705/39 |
| 2016/0055427 A1* | 2/2016 | Adjaoute | | G06Q 30/0201 |
| | | | | 706/12 |
| 2017/0278085 A1* | 9/2017 | Anderson | | G06Q 20/227 |
| 2018/0006821 A1* | 1/2018 | Kinagi | | H04W 12/02 |
| 2018/0053163 A1* | 2/2018 | Khanani | | G06Q 20/3274 |
| 2018/0137505 A1* | 5/2018 | Soppitt | | H04L 63/0823 |
| 2018/0260806 A1* | 9/2018 | Bhuma | | G06Q 20/3226 |
| 2018/0268409 A1* | 9/2018 | Guo | | G06Q 30/06 |
| 2018/0276677 A1* | 9/2018 | Xiao | | G06Q 50/01 |
| 2018/0293562 A1* | 10/2018 | Squire | | G06Q 30/0238 |
| 2018/0315027 A1* | 11/2018 | Kumar | | H04L 63/062 |
| 2019/0073663 A1* | 3/2019 | Jamkhedkar | | G06Q 20/3223 |
| 2019/0081789 A1* | 3/2019 | Madisetti | | G06Q 20/401 |
| 2019/0104410 A1* | 4/2019 | Liu | | G06Q 20/206 |
| 2019/0114589 A1* | 4/2019 | Voss | | G06F 3/0482 |
| 2019/0188680 A1* | 6/2019 | Testa | | G06Q 20/3224 |
| 2019/0197516 A1* | 6/2019 | Gosalia | | G06Q 20/383 |
| 2019/0205865 A1* | 7/2019 | Jamkhedkar | | G06K 7/1417 |
| 2019/0303634 A1* | 10/2019 | Broselow | | G06K 7/1417 |
| 2020/0184050 A1* | 6/2020 | Toth | | H04L 63/0876 |

OTHER PUBLICATIONS

Liebana-Cabanillas, F., Ramos de Luna, I., & Montoro-Rios, F. (2015). User behaviour in QR mobile payment system: The QR payment acceptance model. Technology Analysis & Strategic Management, 27(9), 1031-1049. doi:http://dx.doi.org/10.1080/09537325. 2015.1047757 on Jun. 18, 2020 (Year: 2015).*

* cited by examiner

Method (400)

DYNAMIC ELECTRONIC COMMUNICATION WITH VARIABLE MESSAGES USING ENCRYPTED QUICK RESPONSE CODES

BACKGROUND

An electronic message can be a private form of communication between different members of the platform. Electronic messages can be sent on various platforms, such as a social media platform or a private messaging tool. In social media platforms, personal messaging features can provide a space for private interactions among their users. In private messing tools, users can sign up for accounts and transmit messages to connect privately with selected contacts.

Electronic messaging is very convenient, reliable and precise. A user can easily draft and transmit a personal message on a social media platform, often without any cost to the user. When a user transmits the message, the user is confident that the message and its content will be delivered to the recipient. Moreover, the message can be accessible to the sender and recipient for a long period of time, thereby the sender and the recipient can rely on the message as a record, if any proof of the message is needed. These features have made electronic messaging a very popular mode of communication.

SUMMARY

However, there are situations and applications in which the convenience and precision of electronic messaging is desirable, but the current forms of electronic messaging cannot be implemented. For example, it is desirable to enable users to exploit electronic messaging in brief, one-time interactions between two individuals who do not know each other and might not meet again, e.g., passengers who sit next to each other in a subway, and do not have each other's electronic contact information. Also, because of the nature of these interactions, e.g., one time and brief, it is not feasible or desirable to obtain the other person's contact information. In fact, in these interactions, many individuals prefer not to exchange contact information. Therefore, it is not practical to transmit an electronic message using the traditional electronic platforms.

Yet, in these circumstances, it can still be desirable to exchange electronic messages. It is on object of this disclosure to describe a method and system for exchanging electronic messages well-suited for the peculiar nature of these interactions. Additionally, it is on object of this disclosure to provide the users with the option to share or withhold each of their respective contact information. Moreover, it is an object of this disclosure to enable the users to create dynamic messages, the content of which can be changed after the users interact.

Accordingly, a system transmitting a dynamic message and a method for using the system are proposed. In one example embodiment, a first user is provided with a first client device. The first client device can be in communication with a server. The server can store in a database records associated with a first user account and a second user account. The first user can scan a code printed, shown or displayed on an object. The first client device can read the code and transmit it to the server. The server can activate a default message when it receives the code (or the server can create a record associated with a default message, the code and the first user account (or first client device)). The first user can pass the object to a second user. The second user can scan the physical object at a second client device. The second client device can read the code and transmit it to the server. Once the server receives the code from the second client device, the server can transmit the default message from the first user account to the second user account according to a transmission plan. The second client device can display the transmitted message.

In an example embodiment, after the server activates the default message but before the server transmits the default message to the second client device, the user can customize or modify the default message. For example, the user can change the content of the default message to add new content or remove some of the previous content. In one embodiment, even after the transmission of the default message to the second client device, the user can customize or modify the default message. In this embodiment, the server can transmit a subsequent message after the transmission of the default message when the user modifies the default message.

In an example embodiment, the first user or the second user can specify the transmission plan (or a term or condition associated with the message). For example, the first user can specify that after the second user scans the code, the default message can be transmitted instantaneously. As another example, the first user can specify that the default message can be transmitted two days after when the second user scans the code. In one embodiment, the transmission plan can be specified by an administrator of the server.

In one embodiment, a second user passed an object bearing the code to a first user, and an account of the second user sends a message to the first user. In this embodiment, after a first user scans the code at the first client device, the server can transmit the default message to the first client device (from the second client account or device). In this embodiment, the second user can define the transmission plan, e.g., the default message can be transmitted instantaneously.

In one embodiment, the first client device and the second client device include a software application (or "application"). Each application can include a user intractable user interface for displaying various pages pertaining to the features of the system disclosed herein. For example, there can be a page for activating or editing the default message. As another example, there can be a page for specifying a transmission plan. The application can comprise instructions for execution by a processor in support of the first client device and second client device functionality and operations described herein.

In an example embodiment, the code can be encrypted, and the client device can decrypt the code. For example, the code can be encrypted using a public key and the client device can decrypt the code using a private key. In one embodiment, the code includes a unique number. The code can also include other information such as a payment amount, a user account, etc. In one embodiment, the code does not include any other information other than the unique number. The code can be printed on a sheet of paper by a service provider.

In an example embodiment, the system described herein can be a payment system and the message can be used in a financial transaction as a programmable payment. Peer-to-peer ("P2P") payment systems are used for personal money transfers. However, in order to make payments through P2P payment systems, the users need to exchange sensitive financial information, e.g., account number, name, address, etc. Moreover, a P2P payment system may require both the payer and payee to use the same P2P application. As described before, it is not always feasible to discuss or exchange this information particularly when the parties have a very brief interaction. For example, it is not feasible to exchange this information for small financial transactions such as tipping a bartender.

This disclosure describes a system and method which can address these problems. In an example embodiment, the payment system can include a server, a first client device and a second client device. A first user of the system can own a first bank account and a booklet including at least one code. A second user of the system can own a second bank account. The server can include a database for storing data (or financial data) associated with the first bank account (or a first account), the second bank account (or a second account) and optionally the at least one code included in the booklet.

In an example embodiment, the first user can scan the at least one payment code at the first client device. The first client device, through a user interface, can receive a payment amount, a transmission plan and/or a term for the payment. The first client device can transmit the scanned code as well as the payment amount, transmission plan and/or term for the payment to the server. The server can create a record for a payment transaction (or other transaction) when it receives the code. The server can also specify aspects of the payment transaction based on the payment amount, transmission plan and/or term for the payment. In some embodiments, the server specifies fewer aspects of the payment transaction.

The first user can pass a sheet of the booklet including the at least one code to the second user. The second user can scan the sheet including the at least one code at the second client device. The second client device can optionally receive other information from the second user. The second client device can transmit to the server the scanned code as well as any other information specified by the second user. Upon receipt of the code at the server from the second device, the server can initiate the payment transaction in accordance with the payment amount, transmission plan, term for the payment and any other information specified by the second user. Specifically, the server can update the data associated with the first bank account and the data associated with the second bank account to indicate a payment from the first bank account to the second bank account. The server can also transmit a message or notification to the second client device to provide information regarding the payment.

In an example embodiment, the booklet can include a plurality of removable slips or sheets, and each slip or sheet can contain a code or a unique payment code. The code can be optically scannable by the first and second client devices. The code can contain an authentication feature and can be associated with the first bank account, the second bank account, or both. The code can be assigned a payment amount and one or more transmission or redemption conditions.

In an example embodiment, the initiation of the payment at the server is contingent upon the satisfaction of a condition, e.g., a transmission plan or a redemption condition. In other words, the server can determine whether the condition is satisfied before initiating the payment. In one embodiment, the condition can be the transmission plan, term for the payment or other information specified by the second user.

In an example embodiment, a first or a second user can register a booklet. For example, registering a booklet can include scanning one or more registration codes printed, shown or displayed on the booklet. In one embodiment, when a user scans the registration code, the client device of the user can transmit the registration code to the server. Once the server receives the registration code, the server can associate all the sheets or slips included in the booklet with an account associated with the user.

DETAILED DESCRIPTION OF EXAMPLE EMBODIMENTS

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Figure 1:
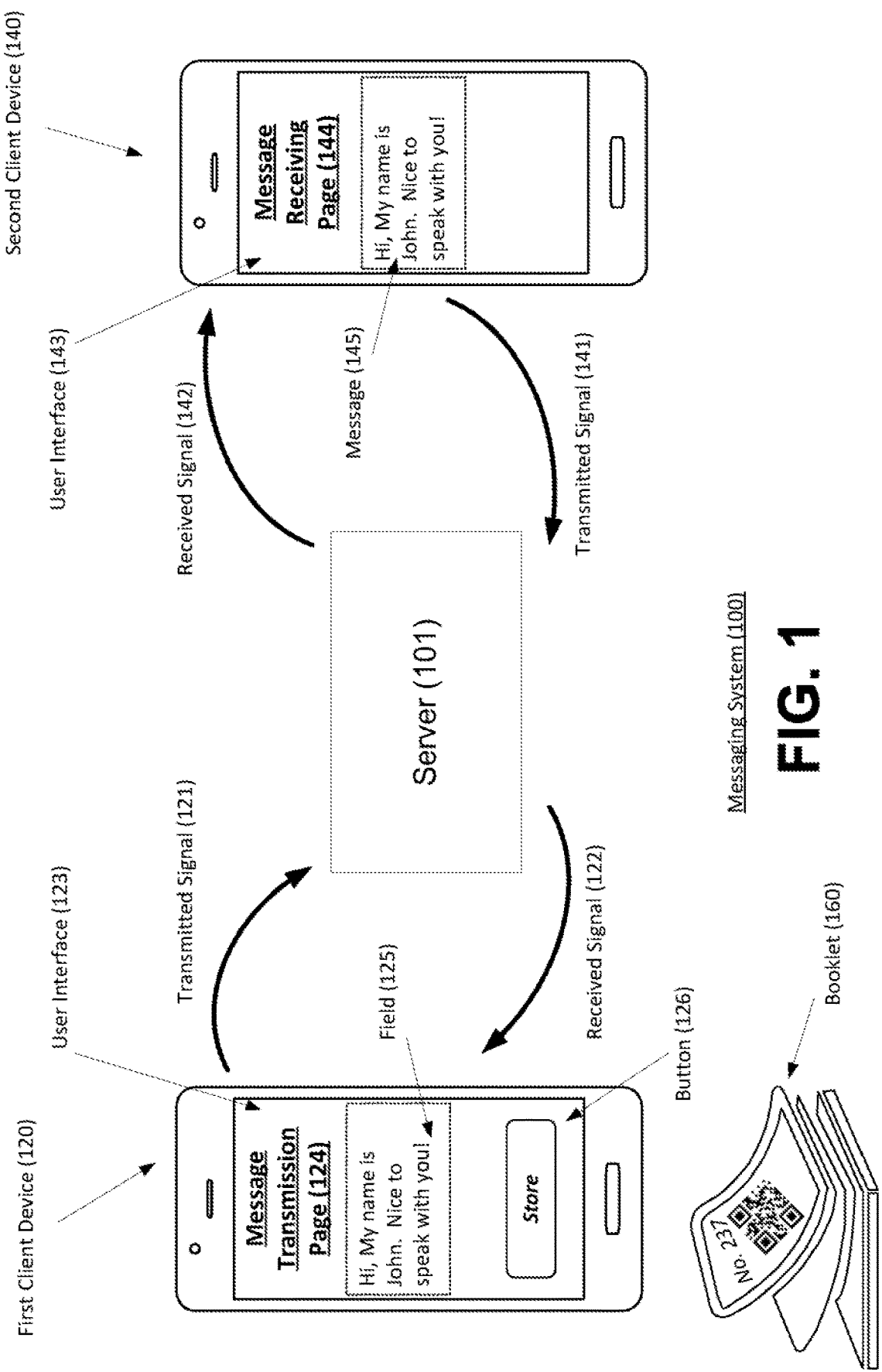
FIG. 1 depicts a messaging system according to an example embodiment.

FIG. 1 depicts a messaging system in accordance with an exemplary embodiment. In this example embodiment, the messaging system 100 includes a server 101, a first client device 120 and a second client device 140.

The server 101 can be any server. For example, the server 101 can be a dedicated server computer, such as a bladed server, or can be a personal computer, laptop computer, notebook computer, palm top computer, network computer, mobile device, or any processor-controlled device capable of supporting the messaging system 100. The server 101 can include a database for storing information relating to the features described in this disclosure. For example, the database can store account information for a first user and second user. The account information can include information relating to a user's messaging account, such as the user's name, email address, username, and password. In one embodiment, the account can store financial information, e.g., bank account information, social security number, transaction history for the account, etc.

In an example embodiment, each client device (e.g., client device 120 and client device 140, hereinafter sometimes referred to as the "client device") can be a device in data communication with the server 101, i.e., the client device can receive a communication from the server and transmit a communication to the server. The client device can be a desktop computer, a mobile phone (e.g., a smartphone, a radiotelephone, etc.), a laptop computer, a tablet computer, a handheld computer, a gaming device, a wearable communication device (e.g., a smart wristwatch, a pair of smart eyeglasses, etc.), a personal digital assistant, a thin client, a fat client, an Internet browser, or a similar type of device. The client device can include a camera for scanning a code displayed on an object.

The client device can include wired or wireless data communication capability. These capabilities can support data communication with a wired or wireless communication network, including the Internet, a cellular network, a wide area network, a local area network, a wireless personal area network, a wide body area network, any other wired or wireless network for transmitting and receiving a data signal, or any combination thereof. The client device can also support a short-range wireless communication interface, such as near field communication, radio-frequency identification, and Bluetooth. For example, the client devices 120 and 140 can transmit signals 121 and 141, respectively, to the server 101. The client devices 120 and 140 can also receive signals 122 and 142, respectively, from the server 101.

In one embodiment, the client device can store a software application, which when executed by the processor of the client device can display a user interface with which the user can interact. The user interface can display at least one page. The page can include buttons, links, fields, etc., which the user can interact with, and through which, the user can provide input to the client device. The input can include a message, a transmission rule for the message or a payment condition for sending a payment. For example, the first client device 120 can display a user interface 123. The user interface 123 can include a message transmission page 124, and on this page, the user can draft a default message. On page 124, there can be a field 125 and the user can type the default message on this field. Additionally, there can be a button 126, and by pressing the button 126, the user can store the message as the user's default message. As another example, the second client device 140 can display a user interface 143. The user interface 143 can include a message receiving page 144, and on this page, the user can read the transmitted message (i.e., a message 145).

In an example embodiment, a booklet 160 can be provided. The booklet 160 can contain a plurality of removable slips and a code or a unique code is printed on each slip. The code can be at least one of a linear barcode, a matrix barcode, a code 11 barcode, a code 39 barcode, a code 93 barcode, a code 128 barcode, a PDF147 barcode, an interleaved 2 of 5 barcode, a codabar, a Universal Product Code barcode, a quick response code, and an image.

In one embodiment, the code can be a quick-response code ("QRC"). The QRC can be a two-dimensional bar code that can encode information. One example QRC can consist of black squares arranged in a square grid on a white background using four standardized encoding modes (numeric, alphanumeric, byte/binary, and kanji) to store data, which can be read or scanned by mobile devices having a camera and the application disclosed herein.

In one example embodiment, a booklet can include a plurality of sheets of paper, each sheet including a code associated with a predetermined message or payment amount. The predetermined message or payment amount can be included in the code. When the first user scans a sheet of the booklet at the first client device, the first client device can read the code which can include the message or payment amount, and modify the default message or payment amount if desired. Subsequently, the first client device can transmit the code and the message or payment amount to the server 101. For example, a booklet can be divided into a standard payment section with a white paper background and several alternate insignia payment sections with multiple colored backgrounds. Each of the standard payment section and the several alternate insignia payment sections can be encoded with a different minimum payment amount on each sheet. The standard payment section can have the least payment amount on each sheet, while the several alternate insignia payment sections can have a higher payment amount on each sheet than the standard payment section. As another example, one or more the sheets may be visually distinct from the other sheets. This distinctness may be provided by, e.g., varying one or more of color, font type, font size, shape, and the arrangement of information on the sheets. These distinctions allow for users to readily differentiate the sheets of the booklets and different payment amounts, different redemption conditions, or other different aspects of a particular sheet may be associated with the various distinctions.

Figure 2:
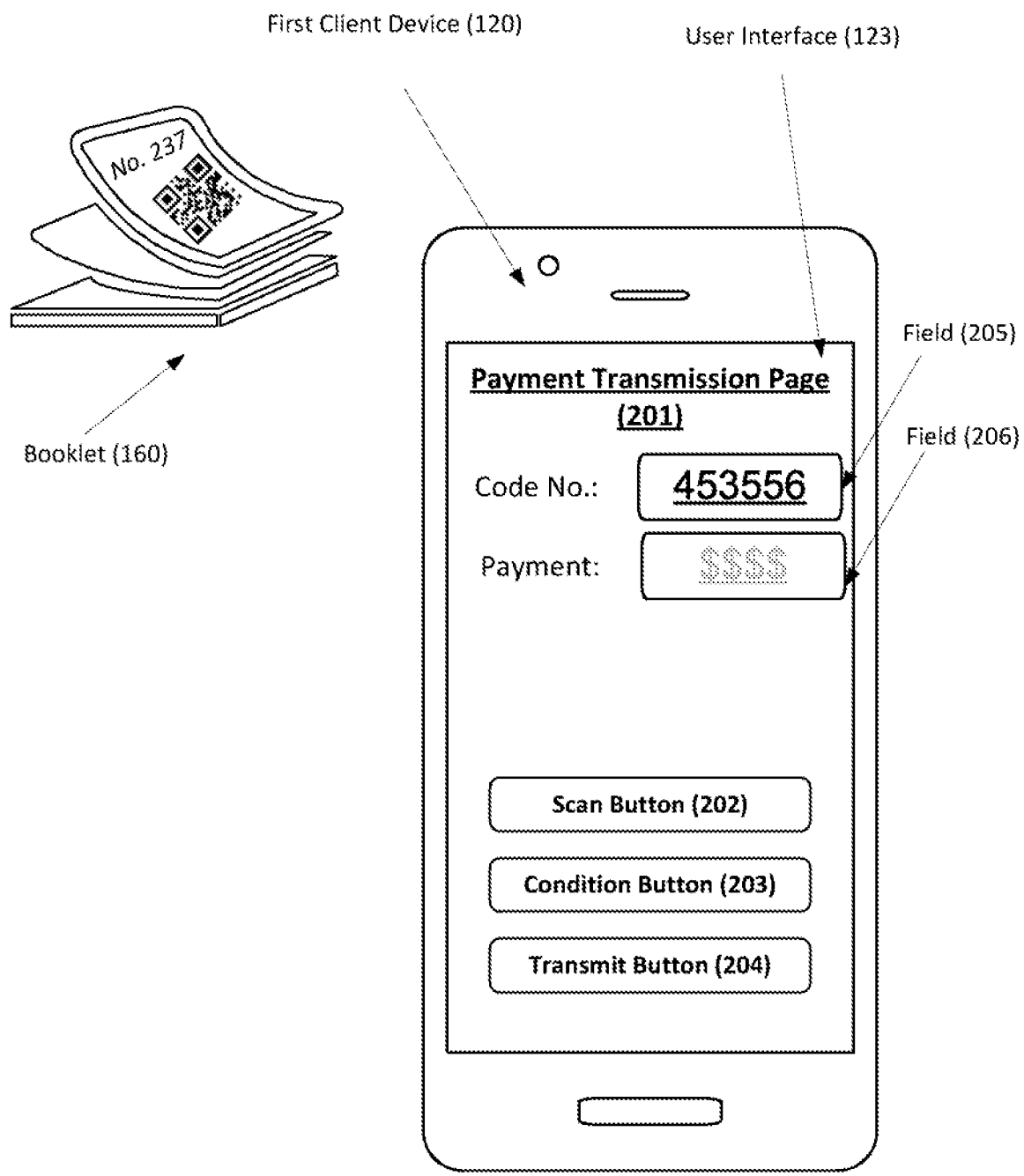
FIG. 2 shows a payment transmission page in the user interface of a first client device according to an example embodiment.

FIG. 2 shows a payment transmission page 201 in the user interface 123 of the first client device 120 according to an example embodiment. In this example embodiment, a first user can scan a sheet 237 of the booklet 160. For example, the page 201 can include a scan button 202. The first user can press the button 202, and when this button is pressed, the user interface 123 of the first client device 120 can transmit an instruction to a camera of the first client device 120. The camera can take a photo of the sheet 237 of the booklet 160. The sheet 237 can include a QRC and an application of the first client device 120 can analyze the photo and convert the QRC in the photo into a code or signal (understandable by the application and the first client device 120). In this example, the code can include a unique number. However, in other embodiments, in addition to or in lieu of a unique code, the code can include a default message (e.g., Hi, nice to speak with you!), a payment amount (e.g., $5), etc. In one embodiment, the code can be an encrypted code and the application can decrypt the code, e.g., by using a private key.

Once the first client device 120 receives the code, the user interface 123 can display the code in a field 205 of the page 201. In this example embodiment, the user can specify a payment amount for the code. For example, the user can tap the area of the user interface 123 which displays a field 206 and type a dollar amount for the payment, e.g., $5. Additionally, the user can press a transmit button 204, which can provide an instruction to the first client device 120 to transmit the code and the payment amount to the server. Although in this example embodiment the user can specify a payment amount when the first client device 120 transmits the code to the server, in some embodiments, the payment amount can be specified later. For example, a day after transmission of the code to the server, the user can specify the payment amount.

In some embodiments, a condition button 203 can be provided on the page 201. The condition button 203 can enable the first user to specify various conditions for the payment. In one embodiment, the user can specify a condition relating to the timing of the transmission of the payment to the second user. For example, the first user can specify that the payment can be transmitted to the second user two days after the second user scans the sheet 237 at the second client device of the second user. In one embodiment, the first user can specify a redemption time window, an expiration time, a redemption location, a password, a security code, a security question, and a biometric authentication requirement for the payment. For example, the first user can specify that the second user can receive the payment only if the second user scans the sheet 237 within 3 days of today and only if the second user is in the United States. In one embodiment, the first user can specify a period of time during which the first user can modify the payment. For example, the first user can specify that the first user can modify the payment amount before or even after the second user scans the sheet at the second user's device. In case the payment is already redeemed to the second user and the first user modifies the payment amount to a lower amount, the server can reimburse the first user. Otherwise, if the payment amount is modified to a higher amount, the server can make an additional payment to the second user.

In one embodiment, the user interface 123 can include a page for opening a new account with a service provider associated with the server. For example, the user can specify a username, password, financial account number, default message, default payment, payment condition, transmission plan, etc. when the user opens the account. In one embodiment, the user interface 123 can include a page for storing prior transactions. On this page, the user can edit or modify these transactions. For example, the user can select a prior transaction and change the payment amount for the transaction. In some embodiments, this editing or modification can take place before the second user scans the code at the second client device. In other embodiments, this editing or modification can take place even after the second user scans the code at the second client device.

In an example embodiment, the server 101 can receive a signal from the first client device 120 including the code and the payment amount (if the payment amount is included in the signal). The server can create a record associated with the payment and the server can associate this record with the first user's account. For example, the server can create a record that for the sheet 237 of the booklet 160, the first user requested a payment of $5 to whoever scans the sheet 237 at the second client device. The server can also include the conditions specified by the first user in the record. In one embodiment, if the user does not specify any conditions, the server can use the default conditions specified by the user when opening the account, e.g., the default payment or default message.

Figure 3:
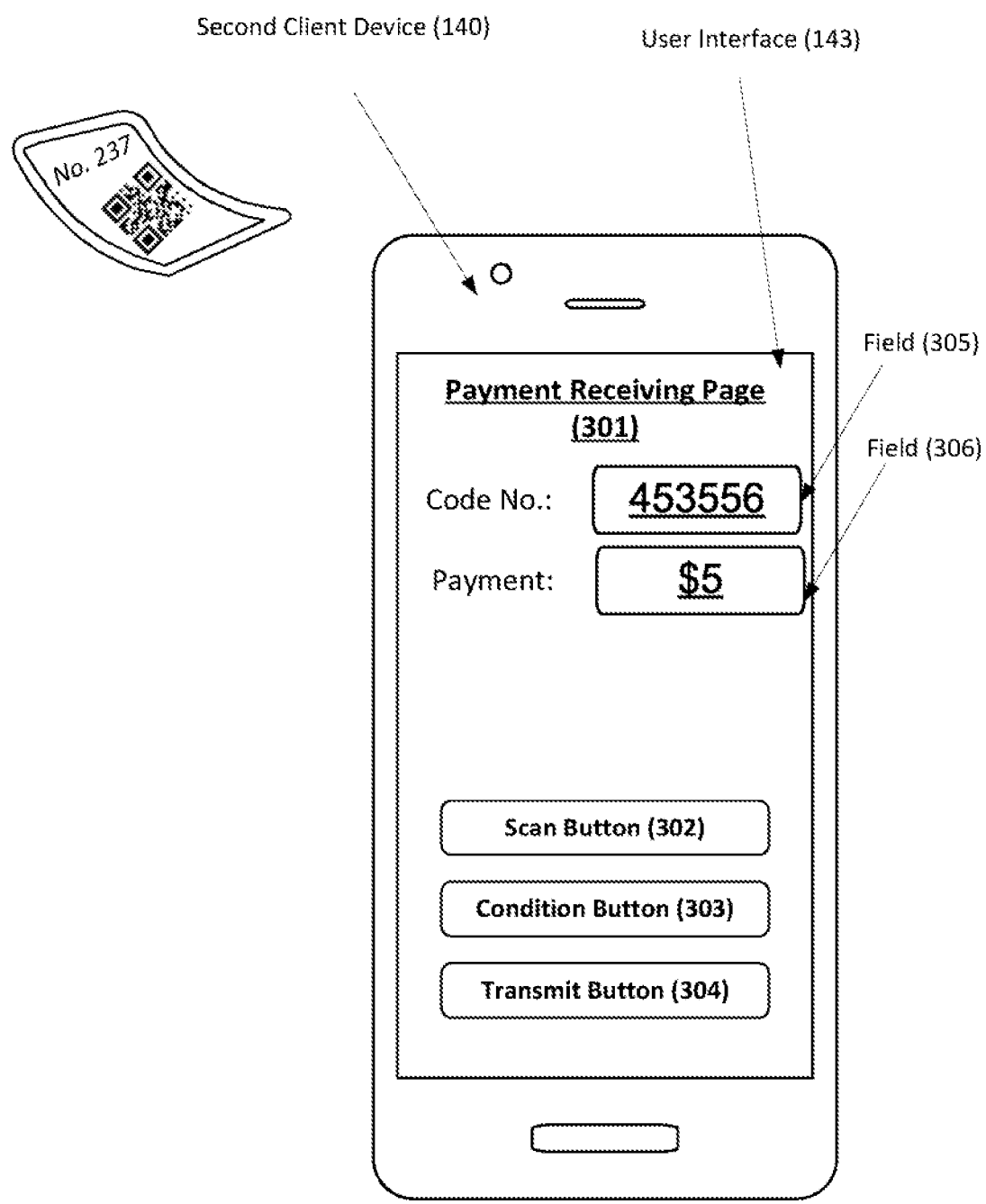
FIG. 3 shows a payment receiving page in the user interface of a second client device according to an example embodiment.

FIG. 3 shows a payment receiving page 301 in the user interface 143 of the second client device 140 according to an example embodiment. In this example embodiment, the first user has provided the second user with the sheet 237 of the booklet 160. The payment receiving page 301 includes a scan button 302. The second user can press the scan button 302, and upon pressing this button, the user interface 143 can instruct a camera of the second client device 140 to take a photo of the sheet 237. The second client device 140 can include an application which can analyze the photo and determine a code or signal associated with the sheet 237. The code can be a QRC. The user interface 143 can display the code in a field 305 of the page 301. The second user can also press a transmit button 304, and upon pressing this button, the second client device 140 can transmit the code to the server. In response, the server can transmit a signal to the second client device 140. The signal can include a payment amount, and the user interface 143 of the second client device 140 can display the payment amount in a field 306 of the page 301.

When the server receives the code from the second client device 140, the server can search for a record associated with the code. The server can determine if all the conditions associated with the record are met, e.g., transmission plan. If so, the server can process the payment and transmit the signal to the second client device 140. However, if at least one condition associated with the record is not met, the server can process the payment later when all the conditions are met or the server can cancel the record, e.g., if a condition will not be met.

In some examples, the first user may elect not to associate a dollar amount with the code at the time the code is provided to the second user. This election may reflect the user's intent to more fully evaluate a purchased good or service after the initial payment is made. For example, if a user purchases a cocktail at a bar, the user may provide a code to pay for the drink but may leave the tip amount unspecified until the cocktail is consumed, to better evaluate the bartender's skill and attentiveness in mixing the drink. As another example, the user may elect to provide a part of the payment at the outset of a transaction, and pay the remainder later, upon successful completion of the transaction. In a further example, the user may provide a code at the outset of a transaction to establish a means of payment, but otherwise leave the entire payment amount unspecified until a later time.

Processing the payment by the server can include updating the records associated with the accounts or financial accounts of each of the first user and the second user. In one embodiment, the server can transmit a signal to another server (e.g., a third-party server) to process the payment. In one embodiment, when a payment is processed, the server can send a signal or message to the first client device to notify the first user that the payment is processed.

In one embodiment, each of the first user and the second user can specify whether the user desires to share the user's information with the other user. For example, the first user can specify as a term that the user desires to share the user's information with the second user. However, the second user does not desire to share the second user's information, e.g., by specifying a term by pressing a condition button 303. When the server processes the payment, if the server determines that all the conditions are met, the server can exchange the users' information in accordance with their respective selections. For example, after processing the payment, the server can send a notification to the second user displaying the first user's information. Also, the server can send a notification to the first user indicating that the second user did not share the second user's information with the first user. In one embodiment, the first user or the second user can specify a condition for sharing their information. For example, the first user or the second user can specify a threshold above which the user's information can be shared with the other party, e.g., the information can be shared for a payment of at least $5.

In one example embodiment, a user (payer) parks her car using a valet parking service. The user can tear one sheet including a QRC to tip the valet. The user can scan the sheet with the user's smart phone to initiate a payment and choose the payment amount, e.g., $20. The user can hand the sheet to the valet. In this example embodiment, each sheet of the payment booklet can include a unique QRC. This way, the payer can track how he or she has spent the money.

In another example embodiment, a tippee (e.g., valet) can have a tip book with a static QRC which a tipping person can scan and make a tip payment to the tippee. In this situation, all the tip slips can have the same QRC since all of the slips can encode the tippee's (recipient) information. For example, a bartender can have a static QRC which the customers can use to tip the bartender. To facilitate tipping according to this example, the static QRC assigned to the bartender can be known to the server handling these transactions, so when the tipping person scans the code the server has sufficient information to process the payment and direct the tip to the bartender.

In one example embodiment, the first user can specify as a condition that when the server is making a payment (on behalf of the first user) that exceeds a threshold, the server should ask the first user for a confirmation. In this example embodiment, when processing the payment, if the first user has set a confirmation condition, the server can send a text message or email to the first user to ensure that the payment was actually authorized by the first user. If the first user responds to the text message or email, the server will proceed to process the payment.

In one example embodiment, the server can apply a machine learning model to the user's payment traits and habits to determine behavior that is usual and unusual for the user. In the event of an unusual behavior by the user, the server can contact the user for a confirmation to prevent fraudulent activity. For example, the server can train the machine learning model on the user's previous tipping behavior. In addition, the server can feed the machine learning model with the user's preferences (e.g., the server can ask the user questions like "how much do you normally tip in this situation?"). Using the user's preferences and prior tipping behavior, the server can get a baseline understanding of how much the user usually tips. Therefore, if the user is trying to tip either outside of the standard range (e.g., exceeding the threshold), or outside the standard range by a predetermined percentage, the server can ask the user for confirmation. In one embodiment, the machine learning model can determine the threshold. The server can ask for a confirmation message through a text message or a push notification before sending the payment to the recipient.

Figure 4:
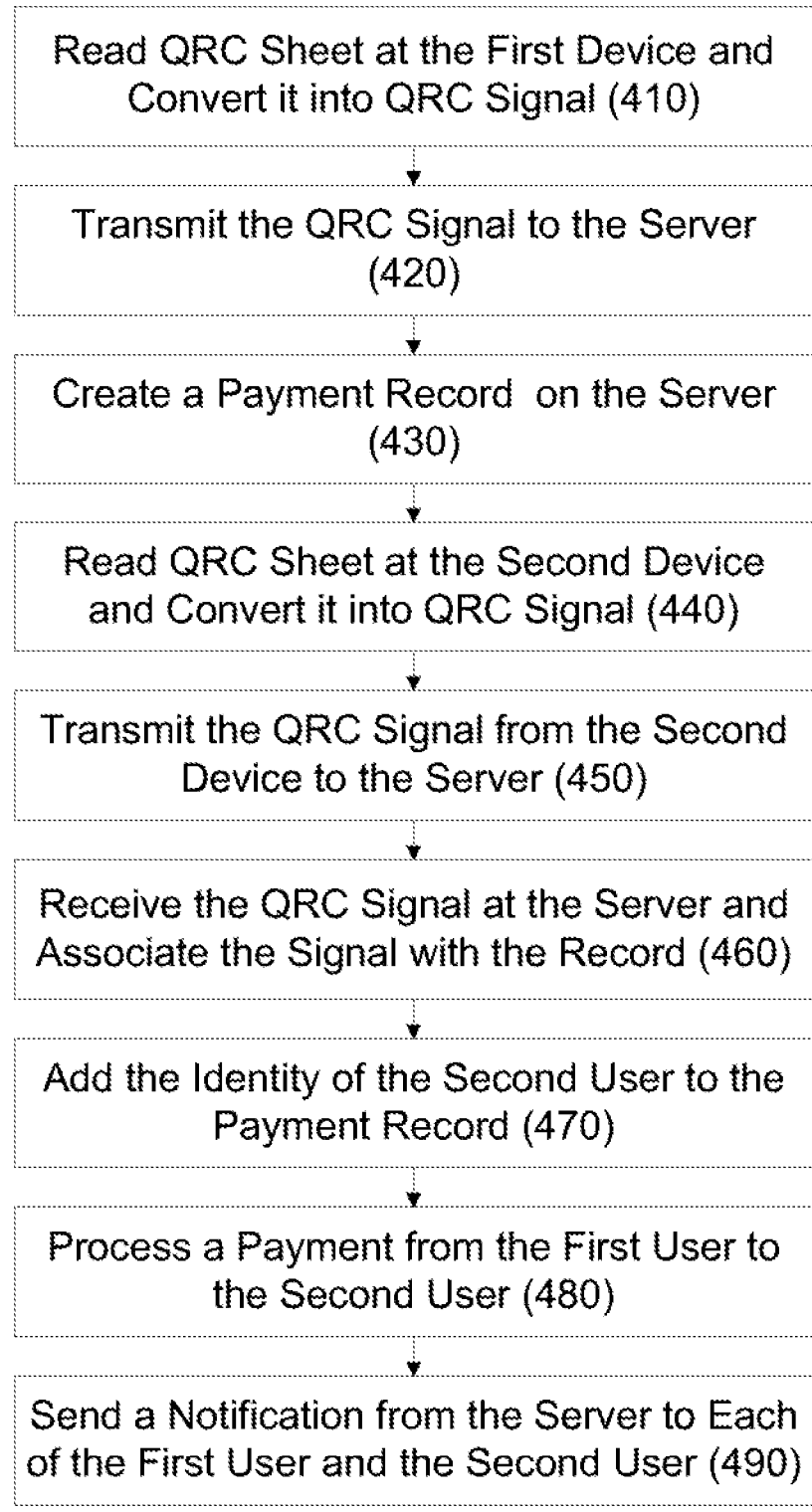
FIG. 4 shows a method for sending a payment using a quick-response code sheet according to an example embodiment.

FIG. 4 illustrates a method 400 for sending a payment using a QRC sheet according to an example embodiment. In this example embodiment, in step 410, a first user can scan a QRC sheet at a first client device of the first user. The first client device can read the QRC and convert it into a signal. In step 420, the first client device can transmit the signal including the QRC to a server. In some embodiments, the QRC signal can include an identity of the first user or the first client device. The server can receive the QRC signal, and in step 430, the server can create a payment record in association with the first user and the QRC. In this example embodiment, because the first user does not specify a payment amount, the server can assign a default payment amount to the payment record.

The first user can pass the QRC sheet to a second user as a form of payment. In step 440, the second user can scan the QRC sheet at a second client device, and the second client device can read the QRC. In step 450, the second client device can transmit a signal including the QRC to the server. In some embodiments, the QRC signal transmitted by the second client device includes an identity of the second user or the second client device, and using this identity, the server can update the payment record. In step 460, the server can receive QRC signal and the server can associate the QRC signal with the payment record. In step 470, the server can add the identity of the second user to the payment record, and in step 480, the server can process a payment from the first user to the second user. In some embodiments, this processing can depend on whether all the conditions associated with the payment record have been satisfied. For example, if the first user requires the server to wait a day before processing the payment, the server can wait for a day after receiving the QRC signal from the second client device, and then the server can process the payment. In step 490, the server can send a notification indicating that the payment is processed to the first client device and the second client device. In one embodiment, in step 480, the server can deny the payment and cancel the record, e.g., because a condition associated with the payment is not met. In this embodiment, in step 490, the server can send a notification indicating that the payment is denied to each of the first user and the second user.

Figure 5:
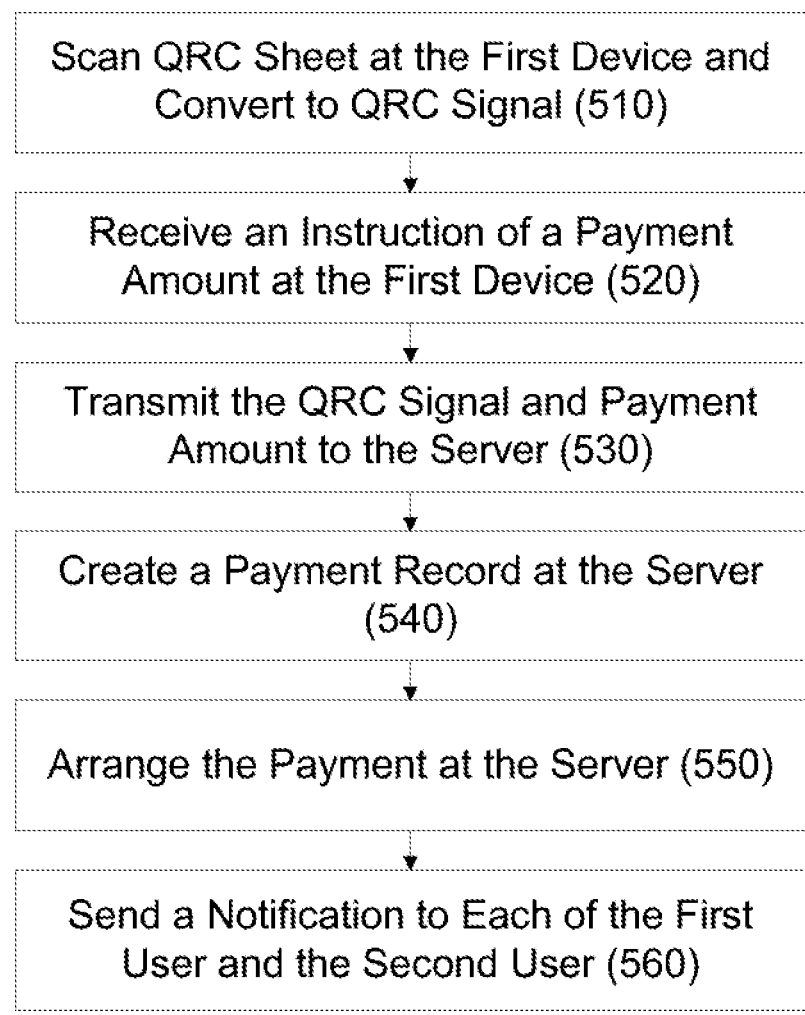
FIG. 5 shows a method for sending a payment using a quick-response code sheet according to an example embodiment.

FIG. 5 illustrates a method 500 for sending a payment using a QRC sheet according to another example embodiment. In this example embodiment, a second user can ask a first user for a payment. As such, the second user can provide the second user's QRC sheet to the first user. The server already knows that the QRC sheet is associated with the second user, e.g., because the second user scanned the QRC sheet prior to passing it to the first user. In step 510, the first user can scan the QRC sheet at the first client device. The first client device can convert the QRC into a QRC signal. In step 520, using an application of the first client device, the first user can specify a payment amount. In step 530, the first client device can transmit the QRC signal, the payment amount and the identity of the first user to the server. In step 540, the server can create a record indicating that a payment from the first user should be made to the second user and the amount of the payment is specified by the first user. The server can identify the second user based on a record of the QRC sheet already scanned by the second user. In step 550, the server can arrange the payment, e.g., by transmitting a signal to a third-party server to process the payment. In step 560, the server can send a notification to each of the first user and the second user that the payment is processed.

In one example embodiment, the QRC can contain information identifying a P2P payment platform. This P2P platform can be utilized to facilitate the payment transactions described herein, and this platform can provide additional security features. For example, the P2P platform can require the recipient to create an account, or log-in to an existing account, prior to receiving the payment. The requirement of submitting login credentials or creating an account can reduce the risk of unauthorized recipients accessing the funds, and this risk can be reduced further through the incorporation of additional security features (e.g., multifactor authentication, biometric authentication, and one-time security codes). While security can be increased, the recipient's information can still be shielded from the sender and the recipient's information would not be required to initiate a transaction. Accordingly, the anonymity between users, privacy, and efficiency of the QRC payment transactions can be maintained.

In another example embodiment, the QRC and the associated transaction can be limited or controlled in view of legal, regulatory, and loss-prevention requirements. For example, the QRC can be limited with respect to the amount of payment that can be sent by imposing a maximum transaction size in order to limit the amount of loss in a compromised transaction. As another example, the transaction facilitated by the QRC can be subject to one or more compliance or regulatory checks prior to completion to prevent e.g., money laundering. The transactions limitations may be implemented by information encoded within the QRC, by a P2P platform or other financial institution facilitating the payment, or a legal or regulatory authority.

Figure 6:
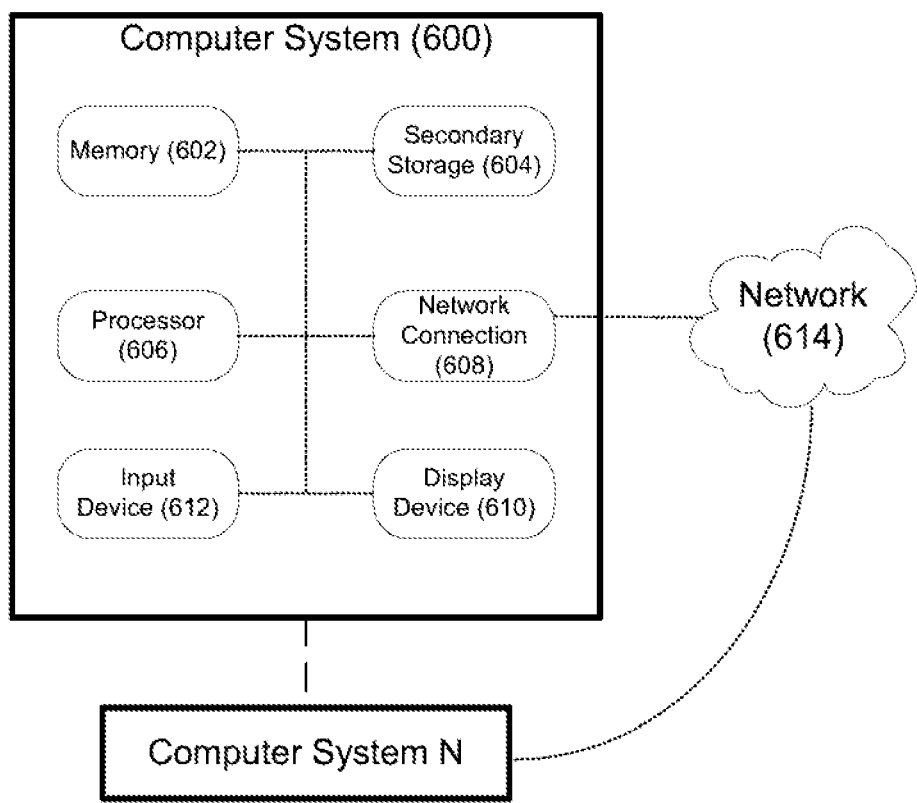
FIG. 6 illustrates a messaging computer system according to an example embodiment.

FIG. 6 illustrates messaging computer system according to an example embodiment. A computer system 600, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 600, may run an application (or software) and perform the steps and functionalities described above. Computer system 600 may connect to a network 614, e.g., Internet, or other network, to receive inquires, obtain data, and transmit information and incentives as described above.

The computer system 600 typically includes a memory 602, a secondary storage device 604, and a processor 606. The computer system 600 may also include a plurality of processors 606 and be configured as a plurality of, e.g., bladed servers, or other known server configurations. The computer system 600 may also include a network connection device 608, a display device 610, and an input device 612.

The memory 602 may include RAM or similar types of memory, and it may store one or more applications for execution by processor 606. Secondary storage device 604 may include a hard disk drive, floppy disk drive, CD-ROM drive, or other types of non-volatile data storage. Processor 606 executes the application(s), such as those described herein, which are stored in memory 602 or secondary storage 604, or received from the Internet or other network 614. The processing by processor 606 may be implemented in software, such as software modules, for execution by computers or other machines. These applications preferably include instructions executable to perform the system and subsystem component functions and methods described above and illustrated in the figures herein. The applications preferably provide graphical user interfaces (GUIs) through which users may view and interact with subsystem components.

The computer system 600 may store one or more database structures in the secondary storage 604, for example, for storing and maintaining the information necessary to perform the above-described functions. Alternatively, such information may be in storage devices separate from these components.

Also, as noted, processor 606 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 600.

The input device 612 may include any device for entering information into the computer system 600, such as a touch-screen, keyboard, mouse, cursor-control device, microphone, digital camera, video recorder or camcorder. The input and output device 612 may be used to enter information into GUIs during performance of the methods described above. The display device 610 may include any type of device for presenting visual information such as, for example, a computer monitor or flat-screen display (or mobile device screen). The display device 610 may display the GUIs and/or output from sub-system components (or software).

Examples of the computer system 600 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 600 is shown in detail, system 600 may use multiple computer systems or servers as necessary or desired to support the users and may also use back-up or redundant servers to prevent network downtime in the event of a failure of a particular server. In addition, although computer system 600 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 600, to perform a particular method, such as methods described above.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The invention claimed is:

1. A server, comprising:
   a database for storage of account information for a first user account and a second user account, the account information comprising a first user preference and first user history;
   a processor; and
   a transceiver;
   wherein:
   the transceiver is configured to receive a signal from a first client device;
   the first client device is configured to scan a code convert the code into the signal and add a payment amount to the signal;
   the processor is configured to create a record for a message and associate the code, the first user account and a threshold with the record, wherein the threshold is determined by applying a machine learning model to the first user preference and first user history;
   the transceiver is configured to receive a second signal from a second client device, wherein the second signal includes the code;
   in response to receiving the second signal, the processor is configured to associate the second account with the record;
   in response to a determination by the processor that a payment is within the threshold, the processor is configured to:

update the first user account and the second user account to reflect a transmission from the first user account to the second user account, and update the first user account and the second user account to reflect a transmission of the payment from the first user account to the second user account;

the transceiver is configured to transmit a first notification to the first client device to indicate whether the transmission took place and a second notification to the second client device to indicate whether the transmission took place; and the first client device is configured to display information associated with the first user account and the second client device is configured to display information associate with the second user account.

2. The server of claim 1, wherein the code is at least one selected from the group of a linear barcode, a matrix barcode, a code 11 barcode, a code 39 barcode, a code 93 barcode, a code 128 barcode, a PDF147 barcode, an interleaved 2 of 5 barcode, a codabar, a Universal Product Code barcode, a quick response code, and an image.

3. The server of claim 1, wherein:
the first client device scans the code from a payment booklet; and
the payment booklet contains a plurality of removable slips and a unique code is printed on each slip.

4. The server of claim 3, wherein the payment booklet and the plurality of removable slips contain no information relating to the first user account other than the code.

5. The server of claim 3, wherein at least one of the code and the plurality of removable slips include an anti-counterfeiting feature.

6. The server of claim 1, wherein:
the processor is configured to associate the record with at least one condition, and
the at least one condition includes at least one selected from the group of a redemption time window, an expiration time, a redemption location, a password, a security code, a security question, and a biometric authentication.

7. The server of claim 6, wherein in response to a determination by the processor that the at least one condition is not met, the processor will not update the first user account and the second user account to reflect a transmission from the first user account to the second user account.

8. The server of claim 1, wherein the processor is configured to withhold or cancel updating the first user account and the second user account to reflect a transmission from the first user account to the second user account if the transceiver receives a fourth signal from the first client device.

9. The server of claim 1, wherein each of the first client device and the second client device is configured to take a photo of a sheet of paper including a quick response code and convert the quick response code to the signal and the second signal, respectively.

10. The server of claim 6, wherein:
the first client device is configured to add a payment amount to the signal;
the at least one condition is whether the payment amount exceeds a threshold associated with the first user account; and
if the payment amount exceeds the threshold, the processor is configured to cause the transceiver to transmit a message to the first client device to confirm the payment amount.

11. A method, comprising:
receiving, at a transceiver of a server, a signal from a first client device, wherein the first client device is configured to scan a code and convert the code into the signal;
creating, at a database of the server, a record for a message and associating the code, a first user account;
retrieving, from the database of the server, a first user preference associated with the first user account and first user history associated with the first account;
determining, using a processor of the server, a threshold by applying a machine learning model to the first user preference and the first user history;
receiving, at the transceiver of the server, a second signal from a second client device, wherein the second signal includes the code;
in response to receiving the second signal, associating, using the processor of the server, the second account with the record;
in response to a determination by the processor that a payment is within the threshold, updating, using the processor of the server:
the first user account and the second user account to reflect a transmission from the first user account to the second user account,
the first user account and the second user account to reflect a transmission of the payment from the first user account to the second user account; and
transmitting, using the transceiver, a first notification to the first client device to indicate whether the transmission took place and a second notification to the second client device to indicate whether the transmission took place.

12. The method of claim 11, wherein the code is at least one selected from the group of a linear barcode, a matrix barcode, a code 11 barcode, a code 39 barcode, a code 93 barcode, a code 128 barcode, a PDF147 barcode, an interleaved 2 of 5 barcode, a codabar, a Universal Product Code barcode, a quick response code, and an image.

13. The method of claim 11, wherein:
the first client device scans the code from a payment booklet; and
the payment booklet contains a plurality of removable slips and a unique code is printed on each slip.

14. The method of claim 11, wherein at least one condition is associated with the record and the processor determines that the at least one condition is met prior to updating the first user account and the second user account, wherein the at least one condition includes at least one selected from the group of a redemption time window, an expiration time, a redemption location, a password, a security code, a security question, and a biometric authentication.

15. The method of claim 14, further comprising:
updating, using the processor, the first user account and the second user account to reflect a transmission of a second payment from the first user account to the second user account if the first client device transmits a third signal including the second payment.

16. A system comprising:
a first client device associated with a first user account comprising first user account information, wherein the first user account information includes a first user preference and first user history; and
a booklet comprising one or more removable slips, each slip containing a unique payment code, wherein each unique payment code is optically scannable by the first client device, wherein:

each unique payment code contains an authentication feature, each unique payment code is configured for association with a second account when optically scanned, and each unique payment code is configured to be assigned a first payment amount and a threshold determined by applying a machine learning model to the first user preference and first user history.

17. The system booklet of claim 16, wherein:

the first client device is configured to scan at least one of the unique payment codes;

upon scanning by the first client device, the at least one of the unique payment codes is associated with the first user account;

the first client device is configured to transmit a signal to a server;

in response to receiving the signal at the server, the server is configured to create a payment record; and in response to receiving a second signal from a second client device, the server is configured to authorize a payment from the first user account to a second account associated with the second client device.

* * * * *